(12) United States Patent
Jain et al.

(10) Patent No.: US 11,539,718 B2
(45) Date of Patent: Dec. 27, 2022

(54) EFFICIENTLY PERFORMING INTRUSION DETECTION

(71) Applicant: VMware, Inc., Palo Alto, CA (US)

(72) Inventors: Jayant Jain, Cupertino, CA (US); Jingmin Zhou, Los Gatos, CA (US); Sushruth Gopal, Sunnyvale, CA (US); Anirban Sengupta, Saratoga, CA (US); Sirisha Myneni, Santa Clara, CA (US)

(73) Assignee: VMWARE, INC., Palo Alto, CA (US)

(*) Notice: Subject to any disclaimer, the term of this patent is extended or adjusted under 35 U.S.C. 154(b) by 334 days.

(21) Appl. No.: 16/739,572

(22) Filed: Jan. 10, 2020

(65) Prior Publication Data
US 2021/0218758 A1 Jul. 15, 2021

(51) Int. Cl.
*H04L 29/06* (2006.01)
*H04L 9/40* (2022.01)
(Continued)

(52) U.S. Cl.
CPC ...... *H04L 63/1416* (2013.01); *G06F 9/45558* (2013.01); *G06F 9/545* (2013.01);
(Continued)

(58) Field of Classification Search
CPC . H04L 63/1416; G06F 9/45558; G06F 9/545; G06F 16/9027; G06F 2009/45587; G06F 2009/45595
See application file for complete search history.

(56) References Cited

U.S. PATENT DOCUMENTS 5,826,051 A 10/1998 Porter et al.
5,950,195 A 9/1999 Stockwell et al.
(Continued)

FOREIGN PATENT DOCUMENTS

CN 102446118 A 5/2012
EP 2748750 A1 7/2014
(Continued)

OTHER PUBLICATIONS

Author Unknown, "CISCO Identity-Based Firewall Security," Month Unknown 2011, 2 pages, CISCO Systems, Inc.
(Continued)

*Primary Examiner* — Baotran N To
(74) *Attorney, Agent, or Firm* — Adeli LLP

(57) ABSTRACT

Some embodiments of the invention provide a method for performing intrusion detection operations on a host computer. The method receives a data message sent by a machine executing on the host computer. For the data message's flow, the method identifies a set of one or more contextual attributes that are different than layers 2, 3 and 4 header values of the data message. The identified set of contextual attributes are provided to an intrusion detection system (IDS) engine that executes on the host computer to enforce several IDS rules. The IDS engine uses the identified set of contextual attributes to identify a subset of the IDS rules that are applicable to the received data message and that do not include all of the IDS rules enforced by the IDS engine. The IDS engine then examines the subset of IDS rules for the received data message to ascertain whether the data message is associated with a network intrusion activity. For instance, in some embodiments, the IDS engine identifies one rule in the identified subset of IDS rules as matching the received data message, and then processes this rule to determine whether the data message is associated with an intrusion.

20 Claims, 5 Drawing Sheets

(51) Int. Cl.
*G06F 16/901* (2019.01)
*G06F 9/54* (2006.01)
*G06F 9/455* (2018.01)

(52) U.S. Cl.
CPC .............. *G06F 16/9027* (2019.01); *G06F 2009/45587* (2013.01); *G06F 2009/45595* (2013.01)

(56) References Cited

U.S. PATENT DOCUMENTS

| | | |
|---|---|---|
| 6,363,477 B1 | 3/2002 | Fletcher et al. |
| 6,430,188 B1 | 8/2002 | Kadambi et al. |
| 6,496,935 B1 | 12/2002 | Fink et al. |
| 6,781,990 B1 | 8/2004 | Puri et al. |
| 6,880,089 B1 | 4/2005 | Bommareddy et al. |
| 7,055,173 B1 | 5/2006 | Chaganty et al. |
| 7,349,382 B2 | 3/2008 | Marimuthu et al. |
| 7,543,054 B1 | 6/2009 | Bansod et al. |
| 7,639,613 B1 | 12/2009 | Ghannadian et al. |
| 7,818,452 B2 | 10/2010 | Matthews et al. |
| 7,843,843 B1 | 11/2010 | Papp, III et al. |
| 7,948,986 B1 | 5/2011 | Ghosh et al. |
| 8,031,599 B2 | 10/2011 | Duffield et al. |
| 8,032,933 B2 | 10/2011 | Turley et al. |
| 8,095,662 B1 | 1/2012 | Lappas et al. |
| 8,190,767 B1 | 5/2012 | Maufer et al. |
| 8,365,294 B2 | 1/2013 | Ross |
| 8,381,209 B2 | 2/2013 | Reumann et al. |
| 8,418,249 B1 | 4/2013 | Nucci et al. |
| 8,484,739 B1 | 7/2013 | Seshadri |
| 8,621,556 B1 * | 12/2013 | Bharali ............. H04L 63/20 726/1 |
| 8,655,307 B1 | 2/2014 | Walker et al. |
| 8,660,129 B1 | 2/2014 | Brendel et al. |
| 8,953,453 B1 | 2/2015 | Xiao et al. |
| 8,966,035 B2 | 2/2015 | Casado et al. |
| 9,009,836 B1 | 4/2015 | Yarykin et al. |
| 9,015,823 B2 | 4/2015 | Koponen et al. |
| 9,215,214 B2 | 12/2015 | Bansal et al. |
| 9,317,696 B2 | 4/2016 | Ayres et al. |
| 9,413,667 B2 | 8/2016 | Beliveau et al. |
| 9,444,841 B2 | 9/2016 | Feroz et al. |
| 9,565,202 B1 | 2/2017 | Kindlund et al. |
| 9,596,135 B1 | 3/2017 | Thomas et al. |
| 9,762,619 B1 | 9/2017 | Vaidya et al. |
| 9,891,940 B2 | 2/2018 | Feroz et al. |
| 9,893,964 B2 | 2/2018 | Mai et al. |
| 9,912,699 B1 | 3/2018 | Hebbar et al. |
| 9,948,611 B2 | 4/2018 | Kumar et al. |
| 9,996,697 B2 | 6/2018 | Mahaffey et al. |
| 9,998,955 B1 | 6/2018 | MacCarthaigh |
| 10,033,693 B2 | 7/2018 | Sengupta et al. |
| 10,228,959 B1 | 3/2019 | Anderson et al. |
| 10,324,746 B2 | 6/2019 | Kumar et al. |
| 10,333,983 B2 | 6/2019 | Vaidya et al. |
| 10,503,536 B2 | 12/2019 | Gunda |
| 10,581,960 B2 | 3/2020 | Gunda et al. |
| 10,606,626 B2 | 3/2020 | Feroz et al. |
| 10,609,160 B2 | 3/2020 | Poon et al. |
| 10,715,607 B2 | 7/2020 | Poon et al. |
| 10,778,651 B2 | 9/2020 | Gunda et al. |
| 10,798,058 B2 | 10/2020 | Sengupta et al. |
| 10,802,857 B2 | 10/2020 | Gunda et al. |
| 10,802,858 B2 | 10/2020 | Gunda |
| 10,802,893 B2 * | 10/2020 | Chanda ............. G06F 21/53 |
| 10,803,173 B2 * | 10/2020 | Gunda ............. G06F 9/45558 |
| 10,805,332 B2 | 10/2020 | Gunda et al. |
| 10,812,451 B2 | 10/2020 | Gunda et al. |
| 10,862,773 B2 * | 12/2020 | Chanda ............. H04L 41/0806 |
| 10,938,837 B2 | 3/2021 | Kumar et al. |
| 11,032,246 B2 | 6/2021 | Gunda et al. |
| 11,108,728 B1 | 8/2021 | Boutros et al. |
| 11,281,485 B2 | 3/2022 | Kumar et al. |
| 11,327,784 B2 | 5/2022 | Gunda et al. |
| 2002/0116523 A1 | 8/2002 | Warrier et al. |
| 2002/0122422 A1 | 9/2002 | Kenney et al. |
| 2003/0005118 A1 | 1/2003 | Williams |
| 2003/0093481 A1 | 5/2003 | Mitchell et al. |
| 2003/0093672 A1 | 5/2003 | Cichowlas |
| 2004/0049701 A1 | 3/2004 | Pennec et al. |
| 2004/0098620 A1 | 5/2004 | Shay |
| 2004/0117407 A1 | 6/2004 | Kumar et al. |
| 2004/0162901 A1 | 8/2004 | Mangipudi et al. |
| 2005/0080898 A1 | 4/2005 | Block |
| 2005/0114711 A1 | 5/2005 | Hesselink et al. |
| 2005/0198125 A1 | 9/2005 | Beck et al. |
| 2005/0257244 A1 | 11/2005 | Joly et al. |
| 2005/0286457 A1 | 12/2005 | Foster et al. |
| 2006/0092861 A1 | 5/2006 | Corday et al. |
| 2006/0109852 A1 | 5/2006 | Hadjiahmad et al. |
| 2007/0061492 A1 | 3/2007 | Riel |
| 2007/0101432 A1 | 5/2007 | Carpenter |
| 2007/0143851 A1 | 6/2007 | Nicodemus et al. |
| 2008/0059474 A1 | 3/2008 | Lim |
| 2008/0072305 A1 | 3/2008 | Casado et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2008/0301630 A1 | 12/2008 | Arnold et al. |
| 2008/0316922 A1 | 12/2008 | Riddle et al. |
| 2008/0320550 A1 | 12/2008 | Strassner et al. |
| 2009/0007251 A1 | 1/2009 | Abzarian et al. |
| 2009/0055427 A1 | 2/2009 | Kulasingam et al. |
| 2009/0070442 A1 | 3/2009 | Kacin et al. |
| 2009/0129271 A1 | 5/2009 | Ramankutty et al. |
| 2009/0150521 A1 | 6/2009 | Tripathi |
| 2009/0158432 A1 | 6/2009 | Zheng et al. |
| 2009/0178061 A1 | 7/2009 | Sandoval et al. |
| 2009/0187963 A1 | 7/2009 | Bori |
| 2009/0193497 A1 | 7/2009 | Kikuchi et al. |
| 2009/0228951 A1 | 9/2009 | Ramesh et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0254990 A1 | 10/2009 | McGee et al. |
| 2009/0265414 A1 | 10/2009 | Bryan |
| 2009/0281996 A1 | 11/2009 | Liu et al. |
| 2009/0327781 A1 | 12/2009 | Tripathi |
| 2010/0037311 A1 | 2/2010 | He et al. |
| 2010/0100616 A1 | 4/2010 | Bryson et al. |
| 2010/0125667 A1 | 5/2010 | Soundararajan |
| 2010/0138515 A1 | 6/2010 | Ruiz-Velasco et al. |
| 2010/0228819 A1 | 9/2010 | Wei |
| 2010/0251363 A1 | 9/2010 | Todorovic |
| 2011/0016467 A1 | 1/2011 | Kane |
| 2011/0022695 A1 | 1/2011 | Dalal et al. |
| 2011/0055848 A1 | 3/2011 | Vainionpää et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0126196 A1 | 5/2011 | Cheung et al. |
| 2011/0208960 A1 | 8/2011 | Flood |
| 2011/0225624 A1 | 9/2011 | Sawhney et al. |
| 2011/0238581 A1 | 9/2011 | Severson et al. |
| 2011/0246637 A1 | 10/2011 | Murakami |
| 2012/0124126 A1 | 5/2012 | Alcazar et al. |
| 2012/0158626 A1 | 6/2012 | Zhu et al. |
| 2012/0207174 A1 | 8/2012 | Shieh |
| 2012/0210423 A1 | 8/2012 | Friedrichs et al. |
| 2012/0222114 A1 | 8/2012 | Shanbhogue |
| 2012/0240182 A1 | 9/2012 | Narayanaswamy et al. |
| 2012/0317570 A1 | 12/2012 | Dalcher et al. |
| 2013/0007740 A1 | 1/2013 | Kikuchi et al. |
| 2013/0007879 A1 | 1/2013 | Esteban et al. |
| 2013/0013669 A1 | 1/2013 | Chun et al. |
| 2013/0018994 A1 | 1/2013 | Flavel et al. |
| 2013/0019276 A1 | 1/2013 | Biazetti et al. |
| 2013/0073743 A1 | 3/2013 | Ramasamy et al. |
| 2013/0085880 A1 | 4/2013 | Roth et al. |
| 2013/0163594 A1 | 6/2013 | Sharma et al. |
| 2013/0205366 A1 | 8/2013 | Luna et al. |
| 2013/0219176 A1 | 8/2013 | Akella et al. |
| 2013/0227097 A1 | 8/2013 | Yasuda et al. |

(56) References Cited

U.S. PATENT DOCUMENTS

| | | |
|---|---|---|
| 2013/0227550 A1 | 8/2013 | Weinstein et al. |
| 2013/0268751 A1 | 10/2013 | Preiss et al. |
| 2013/0332983 A1 | 12/2013 | Koorevaar et al. |
| 2014/0007222 A1 | 1/2014 | Qureshi et al. |
| 2014/0020045 A1 | 1/2014 | Kabat et al. |
| 2014/0040182 A1 | 2/2014 | Gilder et al. |
| 2014/0059163 A1 | 2/2014 | Herbrich et al. |
| 2014/0067779 A1 | 3/2014 | Ojha |
| 2014/0068602 A1 | 3/2014 | Gember et al. |
| 2014/0115578 A1 | 4/2014 | Cooper et al. |
| 2014/0136681 A1 | 5/2014 | Greenlee et al. |
| 2014/0143863 A1 | 5/2014 | Deb et al. |
| 2014/0155043 A1 | 6/2014 | Gell et al. |
| 2014/0173624 A1 | 6/2014 | Kurabayashi |
| 2014/0195666 A1 | 7/2014 | Dumitriu et al. |
| 2014/0215226 A1 | 7/2014 | Litty et al. |
| 2014/0226820 A1 | 8/2014 | Chopra et al. |
| 2014/0230008 A1 | 8/2014 | Feroz et al. |
| 2014/0233385 A1 | 8/2014 | Beliveau et al. |
| 2014/0237119 A1 | 8/2014 | Chung et al. |
| 2014/0281030 A1 | 9/2014 | Cui et al. |
| 2014/0282539 A1 | 9/2014 | Sonnek |
| 2014/0282855 A1 | 9/2014 | Clark et al. |
| 2015/0009995 A1 | 1/2015 | Gross, IV et al. |
| 2015/0012964 A1 | 1/2015 | Xie et al. |
| 2015/0067818 A1 | 3/2015 | Molander et al. |
| 2015/0082301 A1 | 3/2015 | Garg et al. |
| 2015/0096007 A1 | 4/2015 | Sengupta et al. |
| 2015/0106438 A1 | 4/2015 | Fan et al. |
| 2015/0121061 A1 | 4/2015 | Goyal et al. |
| 2015/0134822 A1 | 5/2015 | Bhagwat et al. |
| 2015/0154293 A1 | 6/2015 | Lu |
| 2015/0163117 A1 | 6/2015 | Lambeth et al. |
| 2015/0169345 A1 | 6/2015 | DeCusatis et al. |
| 2015/0172208 A1 | 6/2015 | DeCusatis et al. |
| 2015/0229656 A1 | 8/2015 | Shieh |
| 2015/0269383 A1 | 9/2015 | Lang et al. |
| 2015/0281073 A1 | 10/2015 | Kotha et al. |
| 2015/0350807 A1 | 12/2015 | Andrews et al. |
| 2015/0358231 A1 | 12/2015 | Zhang et al. |
| 2015/0358344 A1 | 12/2015 | Mumcuoglu et al. |
| 2015/0379279 A1 | 12/2015 | Feroz et al. |
| 2015/0381578 A1 | 12/2015 | Thota et al. |
| 2016/0057014 A1 | 2/2016 | Thakkar et al. |
| 2016/0057167 A1 | 2/2016 | Bach |
| 2016/0065456 A1 | 3/2016 | Muley et al. |
| 2016/0072669 A1 | 3/2016 | Saavedra |
| 2016/0087905 A1 | 3/2016 | Liu et al. |
| 2016/0119194 A1 | 4/2016 | Lopez et al. |
| 2016/0142287 A1 | 5/2016 | Yang et al. |
| 2016/0173329 A1 | 6/2016 | Latham et al. |
| 2016/0191413 A1 | 6/2016 | Feroz et al. |
| 2016/0191521 A1 | 6/2016 | Feroz et al. |
| 2016/0212167 A1 | 7/2016 | Dotan et al. |
| 2016/0224789 A1 | 8/2016 | Feroz et al. |
| 2016/0226700 A1 | 8/2016 | Zhang et al. |
| 2016/0232024 A1 | 8/2016 | Hamilton et al. |
| 2016/0234250 A1 | 8/2016 | Ashley et al. |
| 2016/0241389 A1 | 8/2016 | Saint et al. |
| 2016/0294923 A1 | 10/2016 | Fan et al. |
| 2016/0315864 A1 | 10/2016 | Tan et al. |
| 2016/0330138 A1 | 11/2016 | Thomason |
| 2016/0337236 A1 | 11/2016 | Hsu et al. |
| 2016/0359658 A1 | 12/2016 | Yadav et al. |
| 2017/0063883 A1 | 3/2017 | Martinez |
| 2017/0063903 A1 | 3/2017 | Muddu et al. |
| 2017/0093664 A1 | 3/2017 | Lynam et al. |
| 2017/0099197 A1 | 4/2017 | Raney |
| 2017/0118241 A1 | 4/2017 | Call et al. |
| 2017/0126677 A1 | 5/2017 | Kumar et al. |
| 2017/0170990 A1 | 6/2017 | Gaddehosur et al. |
| 2017/0171143 A1 | 6/2017 | Ge et al. |
| 2017/0171159 A1 | 6/2017 | Kumar et al. |
| 2017/0230419 A1 | 8/2017 | Prafullchandra et al. |
| 2017/0264628 A1 | 9/2017 | Treat et al. |
| 2017/0302685 A1 | 10/2017 | Ladnai et al. |
| 2017/0317978 A1 | 11/2017 | Diaz-Cuellar et al. |
| 2018/0063160 A1 | 3/2018 | Kumar |
| 2018/0063194 A1 | 3/2018 | Vaidya et al. |
| 2018/0103011 A1 | 4/2018 | Li et al. |
| 2018/0159733 A1 | 6/2018 | Poon et al. |
| 2018/0159943 A1 | 6/2018 | Poon et al. |
| 2018/0181423 A1 | 6/2018 | Gunda et al. |
| 2018/0181754 A1* | 6/2018 | Gunda ................ G06F 21/552 |
| 2018/0181763 A1 | 6/2018 | Gunda |
| 2018/0183759 A1 | 6/2018 | Gunda et al. |
| 2018/0183761 A1 | 6/2018 | Gunda et al. |
| 2018/0183764 A1 | 6/2018 | Gunda |
| 2018/0183866 A1 | 6/2018 | Gunda et al. |
| 2018/0191763 A1 | 7/2018 | Hillard et al. |
| 2018/0212788 A1 | 7/2018 | Iszlai et al. |
| 2018/0212818 A1 | 7/2018 | Ide et al. |
| 2018/0241761 A1 | 8/2018 | Bania et al. |
| 2018/0331948 A1 | 11/2018 | Jiang et al. |
| 2018/0351912 A1 | 12/2018 | Sengupta et al. |
| 2019/0034454 A1 | 1/2019 | Gangumalla et al. |
| 2019/0036956 A1* | 1/2019 | Gunda ................ H04L 41/046 |
| 2019/0075052 A1 | 3/2019 | Chirreddy et al. |
| 2019/0149525 A1 | 5/2019 | Gunda et al. |
| 2019/0235934 A1 | 8/2019 | Chanda et al. |
| 2019/0238429 A1* | 8/2019 | Chanda ............... H04L 63/0263 |
| 2019/0266004 A1 | 8/2019 | Kumar et al. |
| 2019/0394302 A1 | 12/2019 | Kristiansson et al. |
| 2020/0014662 A1 | 1/2020 | Chanda et al. |
| 2020/0036608 A1 | 1/2020 | Chanda et al. |
| 2020/0225978 A1 | 7/2020 | Feroz et al. |
| 2020/0364074 A1 | 11/2020 | Gunda et al. |
| 2021/0036990 A1 | 2/2021 | Sengupta et al. |
| 2021/0081461 A1 | 3/2021 | Zhou et al. |
| 2022/0029950 A1 | 1/2022 | Boutros et al. |

FOREIGN PATENT DOCUMENTS

| | | |
|---|---|---|
| JP | 2016514295 A | 5/2016 |
| WO | 2008095010 A1 | 8/2008 |
| WO | 2013074828 A1 | 5/2013 |
| WO | 2014126574 A1 | 8/2014 |
| WO | 2014168936 A1 | 10/2014 |
| WO | 2016161799 A1 | 10/2016 |
| WO | 2018044352 A1 | 3/2018 |
| WO | 2018106612 A1 | 6/2018 |
| WO | 2018118465 A1 | 6/2018 |

OTHER PUBLICATIONS

Author Unknown, "Security for IT Pros", Microsoft ISA Server, Microsoft Corporation, May 2013.

Author Unknown, "Virtual Machine Networking: Standards and Solutions", White Paper, Month Unknown 2011, 10 pages, Cisco.

Author Unknown, "AppLogic Features," Jul. 2007, 2 pages. 3TERA, Inc.

Author Unknown, "Enabling Service Chaining on Cisco Nexus 1000V Series," Month Unknown, 2012, 25 pages, CISCO.

Author Unknown, "Next-Generation Firewalls," Month Unknown 2013, 1 page, Palo Alto Networks.

Basak, Debashis, et al., "Virtualizing Networking and Security in the Cloud," Month Unknown 2010, 9 pages, VMware, Inc., Palo Alto, CA.

Brownlee, N., et al., "Traffic Flow Measurement: Architecture," RFC 2722, Oct. 1999, 48 pages, The Internet Society.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Deri, Luca, et al., "nDPI: Open-Source High-Speed Deep Packet Inspection," 2014 International Wireless Communications and Mobile Computing Conference (IWCMC), Aug. 4-8, 2014, 6 pages, IEEE, Nicosia, Cyprus.

Dixon, Colin, et al., "An End to the Middle," Proceedings of the 12th Conference on Hot Topics in Operating Systems, May 2009, 5 pages, USENIX Association, Berkeley, CA, USA.

(56) References Cited

OTHER PUBLICATIONS

Dumitriu, Dan Mihai, et al., (U.S. Appl. No. 61/514,990), filed Aug. 4, 2011, 31 pages.

Flegkas, Paris, et al., "On Policy-Based Extensible Hierarchical Network Management in QoS-Enabled IP Networks," POLICY '01 Proceedings of the International Workshop on Policies for Distributed Systems and Networks, Jan. 29-31, 2011, 17 pages, Springer-Verlag, London, UK.

Guichard, J., et al., "Network Service Chaining Problem Statement," Network Working Group, Jun. 13, 2013, 14 pages, Cisco Systems, Inc.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Moshref, Masoud, et al., "vCRIB: Virtualized Rule Management in the Cloud," HotCloud'12, Jun. 12-13, 2012, 6 pages.

Nance, Kara, et al., "Virtual Machine Introspection: Observation or Interference?," IEEE Security and Privacy, Sep. 1, 2008, 6 pages, vol. 6, No. 5, IEEE Service Center, Los Alamitos, CA, US.

Non-Published Commonly Owned U.S. Appl. No. 16/833,532, filed Mar. 28, 2020, 48 pages, Nicira, Inc.

Rubino, Roberto D., "An Open System for Transparent Firewall Authentication and User Traffic Identification within Corporate Intranets," SIGITE '08, Oct. 16-18, 2008, 5 pages, ACM, Cincinnati, OH, USA.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Schulz-Zander, Julius, et al., "Realizing Software-Defined Wireless Networks: Acheiving Fine-Grained Wi-Fi Programmability with Off-the-Shelf Hardware," Apr. 20, 2016, 126 pages.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Stojanovski, Nenad, et al., "Analysis of Identity Based Firewall Systems," Jun. 2010, 9 pages.

Stojanovski, Nenad, et al., "Architecture of a Identity Based Firewall System," Jul. 2011, 9 pages.

Non-Published Commonly Owned U.S. Appl. No. 17/063,415, filed Oct. 5, 2020, 35 pages, Nicira, Inc.

Johnson, Maritza L., et al., "Laissez-faire File Sharing: Access Control Designed for Individuals at the Endpoints," NSPW '09: Proceedings of the 2009 Workshop on New Security Paradigms Workshop, Sep. 8-11, 2009, 9 pages, ACM, Oxford, United Kingdom.

Non-Published Commonly Owned U.S. Appl. No. 16/945,736, filed Jul. 31, 2020, 98 pages, Nicira, Inc.

Non-Published Commonly Owned U.S. Appl. No. 17/739,534, filed May 9, 2022, 99 pages, Nicira, Inc.

\* cited by examiner

EFFICIENTLY PERFORMING INTRUSION DETECTION

Intrusion Detection Systems (IDS) are typically deployed as middleboxes or bump in the wire solutions inspecting traffic between applications. They typically deal with network flows and perform deep packet inspection to identify protocols used by the flows and apply rules configured in the system based on the identified protocols. However, the rule generation processes of the IDS systems are based on actual vulnerability of specific applications, like MS Outlook, Sharepoint or OpenSSL. For instance, rules can be crafted to determine whether the vulnerability affects Linux or Windows, and which Windows systems.

As a middlebox service, an IDS system does not have visibility into the applications. The IDS system only typically identifies the flow's protocol and then applies all rules that are relevant for the identified protocol regardless of which actual application has generated the stream. At most, the optimization involves rule deployment if one of the application or operating system is deployed in the environment. This leads to a thorough but a very inefficient processing infrastructure leading to a much higher probability of generation of false positives, which often results in the administrators turning off the IDS system operations.

BRIEF SUMMARY

Some embodiments of the invention provide a method for performing intrusion detection operations on a host computer. The method receives a data message sent by a machine executing on the host computer. For the data message's flow, the method identifies a set of one or more contextual attributes that are different than layers 2, 3 and 4 header values of the data message. Examples of contextual attributes include the source application name, the application version, traffic type identifier, resource consumption, threat level, user ID, group ID, etc.

The identified set of contextual attributes are provided to an intrusion detection system (IDS) engine that executes on the host computer to enforce several IDS rules. The IDS engine uses the identified set of contextual attributes to identify a subset of the IDS rules that are relevant to the received data message and that do not include all of the IDS rules enforced by the IDS engine. In some embodiments, the IDS engine uses the identified set of contextual attributes to filter out the IDS rules that are not relevant to the data message flow. In other embodiments, the IDS engine uses the identified set of contextual attributes to search a data structure that identifies IDS rules that are associated with contextual attributes. The data structure is a trie structure.

The IDS engine then examines the subset of IDS rules for the received data message to ascertain whether the data message is associated with a network intrusion activity. For instance, in some embodiments, the IDS engine identifies one rule in the identified subset of IDS rules as matching the received data message, and then processes this rule to determine whether the data message is associated with an intrusion.

In some embodiments, the method identifies the set of contextual attributes by using an identifier of the flow (e.g., the flow's five tuple) to obtain the set of contextual attributes from a context engine executing on the host computer. The context engine in some of these embodiments obtains the set of contextual attributes from a guest introspection agent executing on a machine that executes on the host computer and that is a source of the data message flow. In other embodiments, the method identifies the set of contextual attributes by extracting the set of contextual attributes from an encapsulating header for the received data message.

In still other embodiments, the method identifies the set of contextual attributes by obtaining the set of contextual attributes from the source machine (i.e., the machine that executes on the host computer and that is the source of the data message flow) when the source machine powers up and starts to operate on the host computer. Also, in some embodiments, the identified set of contextual attributes includes at least one contextual attribute specified by an administrator for the source machine or for an application executing on the source machine. The IDS engine is a virtual machine or container in some embodiments, while it is a module executing in a user space or kernel space of an operating system or hypervisor executing on the host computer.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
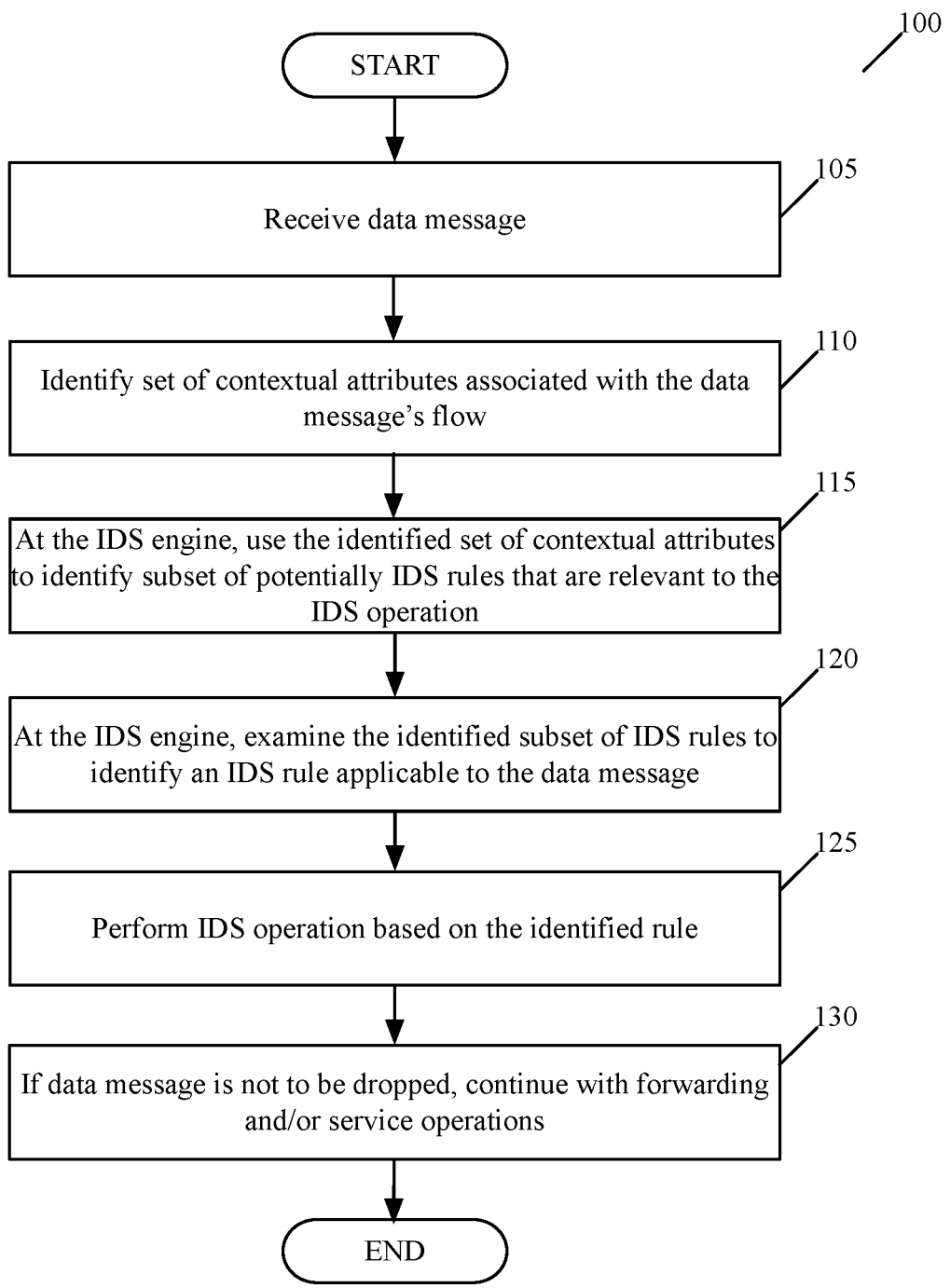
FIG. 1 illustrates a process performed by some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for performing intrusion detection operations on a host computer. The method receives a data message sent by a machine executing on the host computer. For the data message's flow, the method identifies a set of one or more contextual attributes that are different than layers 2, 3 and 4 header values of the data message. The identified set of contextual attributes are provided to an intrusion detection system (IDS) engine that executes on the host computer to enforce several IDS rules.

The IDS engine uses the identified set of contextual attributes to identify a subset of the IDS rules that are applicable to the received data message and that do not include all of the IDS rules enforced by the IDS engine. The IDS engine then examines the subset of IDS rules for the received data message to ascertain whether the data message is associated with a network intrusion activity. For instance, in some embodiments, the IDS engine identifies one rule in the identified subset of IDS rules as matching the received data message, and then processes this rule to determine whether the data message is associated with an intrusion.

The above-described method provides an efficient method for performing IDS operations, as it allows the IDS engine to only examine IDS rules that are applicable to a data message flow, while ignoring a potentially large number of other IDS rules that are irrelevant to the data message flow. For instance, when a large number of applications operates on a diverse set of operating systems on the machines executing on the host computer, a very large number of IDS rules can be specified for these applications, operating systems and machines. However, using the methodology of some embodiments, the IDS engine uses the contextual attributes associated with a data message flow to quickly filter out the irrelevant IDS rules and to identify and examine only the IDS rules that are relevant to the data message flow.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

FIG. 1 illustrates a process 100 that implements the method of some embodiments of the invention. The process 100 in some embodiments is performed on a host computer on which a machine that is the source of a data message flow executes. In some embodiments, a service-initiating filter in the egress path of the data message flow performs the process 100 along with an IDS engine that executes on the host computer, as further described below by reference to FIG. 2. The IDS engine is a service virtual machine (VM) or container in some embodiments, while it is a service module executing in a user space or kernel space of an operating system or hypervisor executing on the host computer.

The process 100 initially receives (at 105) a data message sent by the source machine executing on the host computer. The source machine is a VM or container in some embodiments. The received data message is part of a data message flow, and in some embodiments, it is a first data message in this flow. Also, in some embodiments, the service-initiating filter in the source machine's egress path identifies the data message as it passes along the egress path and calls the IDS engine to analyze the data message.

For the data message's flow, the process 100 identifies (110) a set of one or more contextual attributes that are different than layers 2, 3 and 4 header values of the data message. Examples of contextual attributes include the source application name (i.e., the name of the application that executes on the source machine and that is the source of the data message flow), the application version, traffic type identifier (i.e., type of traffic carried in the data message payload), resource consumption (i.e., amount of resource consumed by the source application), threat level associated with the source application and/or data message flow, user ID associated with the source application or source machine, group ID associated with the source application or source machine, etc.

In some embodiments, the process 100 identifies the set of contextual attributes by using an identifier of the flow (e.g., the flow's five tuple) to obtain the set of contextual attributes from a context engine executing on the host computer. The context engine in some of these embodiments obtains the set of contextual attributes from a guest introspection agent executing on the source machine when the data message flow starts (e.g., upon a request for a network connection for the data message flow) and/or when the source machine powers up. In some embodiments, the context engine also supplements these contextual attributes with contextual attributes that it obtains from a set of other service modules executing on the host computer (e.g., obtains traffic type identifier or threat level from a deep packet inspector or threat level detector executing on the host computer). This set of service engines in some embodiments process the data message flow before the IDS engine.

In some embodiments, context engine stores each flow's associated contextual attributes with the flow's identifier, such that the contextual attributes can be retrieved for a flow by using its associated flow identifier. The IDS engine in some of these embodiments uses the data message's flow identifier to obtain the contextual attribute set for the received data message from the context engine. In other embodiments, a module external to the IDS engine uses the flow identifier to collect the contextual attribute set for the flow, and then provides the collected contextual attribute set to the IDS engine.

In still other embodiments, the process 100 identifies the set of contextual attributes by extracting the set of contextual attributes from an encapsulating header for the received data message. In some embodiments, the process 100 (e.g., the context engine or another module on the host) identifies the set of contextual attributes by obtaining the set of contextual attributes from the source machine (i.e., the machine that executes on the host computer and that is the source of the data message flow) when the source machine powers up and starts to operate on the host computer. Also, in some embodiments, the identified set of contextual attributes includes at least one contextual attribute specified by an administrator for the source machine or for an application executing on the source machine.

At 115, the IDS engine uses the identified set of contextual attributes to identify a subset of the IDS rules that are relevant to the received data message and that do not include all of the IDS rules enforced by the IDS engine. In some embodiments, the IDS engine uses the identified set of contextual attributes to filter out the IDS rules that are not relevant to the data message flow. In other embodiments, the IDS engine uses the identified set of contextual attributes to search a data structure that identifies IDS rules that are associated with contextual attributes.

The searched data structure is a trie structure in some embodiments. A trie data structure is a tree-like data structure that has numerous nodes and branches that connect the nodes. Each node is associated with a character. By structuring the nodes in a particular way, nodes can be made to represent words and strings. The trie structure can then be searched by traversing down the branches along a path to find a node that specifies a word or string that matches a particular contextual attribute. Each such node in some embodiments stores or has a reference to one or more rule identifiers that identify one or more IDS rules applicable to the contextual attribute associated with the node.

After using the identified contextual attribute set to identify the subset of IDS rules that are applicable to the data message flow, the IDS engine then examines (at 120) the identified subset of IDS rules for the received data message to ascertain whether the data message is associated with a network intrusion activity. For instance, in some embodiments, the IDS engine identifies one rule in the identified subset of IDS rules as matching the received data message, and then processes this rule to determine whether the data message is associated with an intrusion.

To identify a matching IDS rule in the identified subset of applicable IDS rules, the IDS engine matches the flow identifier (e.g., the five-tuple identifier) and/or the flow's associated context attribute set to the rule identifiers of the IDS rules. Each IDS rule in some embodiments has a rule identifier defined in terms of one or more flow header values and/or one or more contextual attributes. Also, in some embodiments, each IDS rule also specifies IDS action parameters, such as Allow or Drop that specify that the data message should be allowed to pass as it does not relate to an intrusion activity, or should be dropped as it relates to an intrusion activity.

After identifying a matching IDS rule, the IDS engine performs (at 125) an IDS operation based on the action parameter of the matching IDS rule. In some embodiments, the IDS operation specifies that the data message should be dropped when the matching rule's action specifies a Drop, but otherwise specifies that the data message should be allowed to pass through. In addition to dropping the data message, the IDS rules can also specify alert and log actions instead of or in conjunction with the dropping of the data message.

An alert action generates a notification regarding the identified intrusion with all the relevant details, such as the signature/rule identifier and other details regarding the message flow, such as the five tuple identifier and contextual attributes. An alert action in some embodiments directs the IDS engine 222 to generate a message that contains the generated notification with all of its associated data, and send this message to a server (e.g., a controller) that further analyzes the detected intrusion event.

The log action in some embodiments records similar data (e.g., signature/rule identifier, five tuple identifier of the flow and contextual attributes of the flow), but stores this data in a log file that is sent to or retrieved by a server (e.g., a controller) at a later time for the server to analyze the detected intrusion event(s). At 125, the IDS engine in some embodiments also creates a record in a connection tracker with the result of its IDS operation for the data message's flow, so that it can use this record for subsequent data messages of this flow that it is directed to analyze.

Once the IDS engine performs its IDS operation (at 125), the process 100 continues (at 130) with the forwarding and/or service operations of the data message on the host computer, when the data message is not supposed to be dropped. This operation entails passing the data message to the next service engine on the host computer to perform the next middlebox service operation on the data message, or passing the data message to a forwarding element (e.g., software switch or router) executing on the host computer to forward the data message to its destination. When the IDS engine specifies (at 125) the data message should be dropped, the process drops (at 130) the data message. After 130, the process ends.

Figure 2:
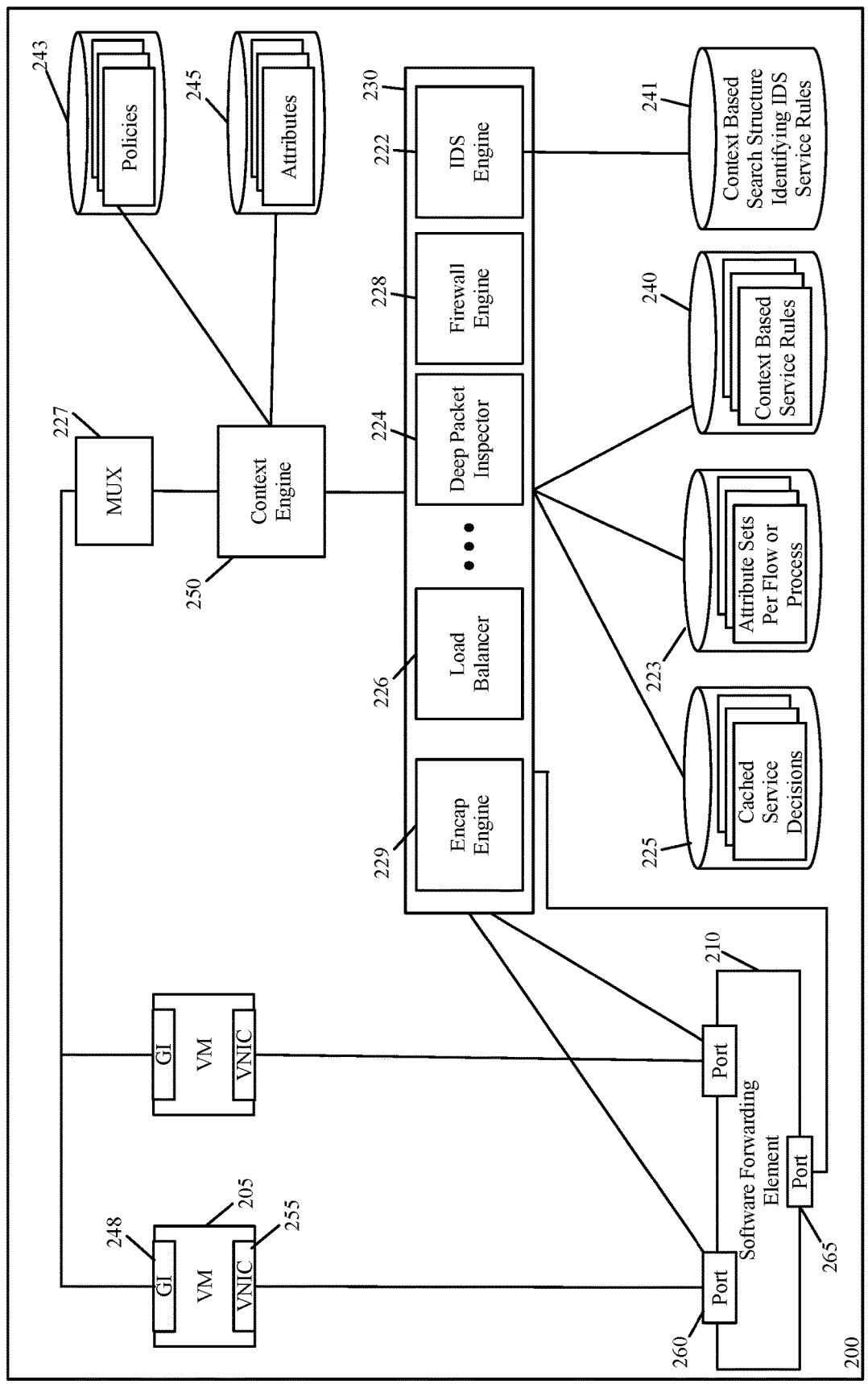
FIG. 2 illustrates a host computer that implements the process of FIG. 1.

FIG. 2 illustrates a host computer 200 that is used in some embodiments to implement the process 100 of FIG. 1. The host computer 200 includes several VM 205, a software forwarding element 210, a context engine 250, service engines 230, context-based service rule storage 240, context-attribute storage 245, an attribute-mapping storage 223, a connection state cache storage 225, a MUX (multiplexer) 227, and a context-engine policy storage 243. The service engines 230 include an IDS engine 222, a deep packet inspector 224, a load balancer 226, a firewall engine 228, an encapsulation module 229 and one or more other service engines (not shown).

In FIG. 2, the VMs 205 execute on a hypervisor. In some embodiments, the context engine 250, the software forwarding element 210, the service engines 230, the context-based service rule storages 240, the connection state cache storage 225, the context-engine policy storage 243, and the MUX 227 operate in the kernel space of the hypervisor, while the VMs 205 operate in the hypervisor's user space. In other embodiments, one or more service engines (e.g., the IDS engine) and/or the context engine are user space modules (e.g., are service VMs).

In some embodiments, the VMs 205 are tenant machines that serve as data end points for some or all tenant data message flows in the datacenter. Examples of such machines include webservers, application servers, database servers, etc. In some cases, all the VMs belong to one entity, e.g., an enterprise that operates the host. In other cases, the host 200 operates in a multi-tenant environment (e.g., in a multi-tenant data center), and different VMs 205 may belong to one tenant or to multiple tenants.

Each VM 205 includes a GI agent 248 that communicates with the context engine 250 to provide contextual attribute sets to this engine, and to receive instructions and queries from this engine. The communications between the context engine 250 and the GI agents 248 are relayed through the MUX 227. One example of such a mux is the mux that is used by the Endpoint Security (EPSec) platform of ESX hypervisors of VMware, Inc. In some embodiments, the attributes collected by the context engine 250 from the GI agents 248 include a rich group of parameters (e.g., layer 7 parameters, process identifiers, user identifiers, group identifiers, etc.). U.S. patent application Ser. No. 15/650,251, now published as U.S. Patent Publication 2018/0181423, filed Jul. 14, 2017, further describes the capturing and use of these contextual attributes through the GI agent 248. The U.S. patent application Ser. No. 15/650,251, now published as U.S. Patent Publication 2018/0181423, is incorporated herein by reference.

In some embodiments, the context engine supplements the contextual attributes that it receives through the GI agents 248 with contextual attributes that it obtains from one or more service modules executing on the host computer. For instance, from the deep packet inspector 224, the context engine in some embodiments obtains a traffic type identifier (e.g., the AppID) that describes the type of traffic carried in a data message flow's payload. Also, in some embodiments, the context engine 250 obtains a threat level from a threat level detector (not shown) executing on the host computer. This set of service engines in some embodiments process the data message flow before the IDS engine.

As shown, each VM 205 includes a virtual network interface card (VNIC) 255 in some embodiments. Each VNIC is responsible for exchanging messages between its VM and the SFE 210. Each VNIC connects to a particular port 260 of the SFE 210. The SFE 210 also connects to a physical network interface card (NIC) (not shown) of the host. In some embodiments, the VNICs are software abstractions that the hypervisor creates for one or more physical NICs (PNICs) of the host.

In some embodiments, the SFE 210 maintains a single port 260 for each VNIC of each VM. The SFE 210 connects to the host PNIC (through a NIC driver (not shown)) to send outgoing messages and to receive incoming messages. In some embodiments, the SFE 210 is defined to include a port 265 that connects to the PNIC's driver to send and receive messages to and from the PNIC. The SFE 210 performs message-processing operations to forward messages that it receives on one of its ports to another one of its ports. For example, in some embodiments, the SFE tries to use data in the message (e.g., data in the message header) to match a message to flow based rules, and upon finding a match, to perform the action specified by the matching rule (e.g., to hand the message to one of its ports 260 or 265, which directs the message to be supplied to a destination VM or to the PNIC).

In some embodiments, the SFE 210 is a software switch, while in other embodiments it is a software router or a combined software switch/router. The SFE 210 in some embodiments implements one or more logical forwarding elements (e.g., logical switches or logical routers) with SFE executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the VMs of one logical network from the VMs of another logical network that is serviced by another logical forwarding element. A logical forwarding element can connect VMs executing on the same host and/or different hosts. In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013-05-08), VXLAN: A Framework for Overlaying Virtualized Layer 2 Networks over Layer 3 Networks, IETF.

The ports of the SFE 210 in some embodiments include one or more function calls to one or more modules that implement special input/output (I/O) operations on incoming and outgoing messages that are received at the ports. Examples of I/O operations that are implemented by the ports 260 and 265 include ARP broadcast suppression operations and DHCP broadcast suppression operations, as described in U.S. Pat. No. 9,548,965. Other I/O operations (such as IDS operations, firewall operations, load-balancing operations, network address translation operations, etc.) can be so implemented in some embodiments of the invention. By implementing a stack of such function calls, the ports can implement a chain of I/O operations on incoming and/or outgoing messages in some embodiments. Also, in some embodiments, other modules in the data path (such as the VNICs 255, etc.) implement the I/O function call operations instead of, or in conjunction with, the ports 260 and 265.

In some embodiments, one or more of function calls of the SFE ports 260 or 265 can be to one or more service engines 230. The following description is applicable to the operation of any one service engine 230 (e.g., the IDS engine 222, the load balancer 226, etc.) once an SFE port 260 or 265 calls the service engine. Each of these service engines processes a set of service rules on the data message flows sent to and received for the VMs. Some of these service rules are context-based service rules in the context-based service rule storages 240. Each service engine 230 in some embodiments has its own context-based service rule storage 240, attribute-mapping storage 223, and connection state cache storage 225.

FIG. 2 presents just one context-based service rule storage 240, attribute-mapping storage 223, and connection state cache storage 225 for all the service engines in order not to obscure the presentation in this figure with unnecessary detail. Also, in some embodiments, each VM can have its own instance of a service engine (e.g., its own instance of IDS engine 222, deep packet inspector 224, load balancer 226, and firewall engine 228). In other embodiments, one service engine can service data message flows for multiple VMs on a host (e.g., VMs for the same logical network).

To perform its service operation for a data message flow, a service engine 230 in some embodiments tries to match the flow identifier (e.g., the five-tuple identifier) and/or the flow's associated context attribute set to the rule identifiers of its service rules in its context-based service rule storage 240. Specifically, for a service engine 230 to perform its service check operation for a data message flow, the SFE port 260 that calls the service engine supplies a set of attributes of a message that the port receives.

In some embodiments, the set of attributes are message identifiers, such as traditional five-tuple identifiers. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in the logical domain, while other identifier values are defined in the physical domain.

The service engine in some embodiments then uses the received message's attribute set (e.g., the message's five-tuple identifier) to identify the context attribute set that the service engine has stored for this flow in the attribute-mapping storage 223. The context engine 250 in some embodiments supplies the context attributes for new flows (i.e., new network connection events) to the service engines 230, along with a flow identifier (e.g., a five-tuple identifier). The context-engine policy storage 243 contains the rules that control the operation of the context engine 250. In some embodiments, these policies direct the context engine to generate rules for the service engines or to direct the service engines to generate rules. The service engines 230 in these embodiments store the context attributes that they receive from the context engine in the attribute-mapping storage 223.

In some embodiments, a service engine 230 stores the context attribute set for each new flow with that flow's identifier (e.g., five-tuple identifier) in the attribute-mapping storage. In this manner, the service engine can identify the context attribute set for each new flow that it receives from the SFE ports 260 by searching its attribute-mapping storage 223 for a context record that has a matching flow identifier. The context record with the matching flow identifier includes the context attribute set for this flow.

Some or all of the service engines in some embodiments pull the context attribute sets for a new flow from the context engine. For instance, in some embodiments, a service engine supplies a new flow's five-tuple identifier that it receives from the SFE port 260, to the context engine 250. The context engine 250 then examines its attribute storage 245 to identify a set of attributes that is stored for this five-tuple identifier, and then supplies this attribute set (or a subset of it that it obtains by filtering the identified attribute set for the service engine) to the service engine.

Some embodiments implement the pull model by using a service token to encode the attribute set for a new message flow. When notified of a new network connection event, the context engine 250 in some embodiments (1) collects the context attribute set for the new event, (2) filters this set to discard the attributes that are not relevant for performing one or more services on the flow, (3) stores the remaining filtering attribute subset in the attribute storage 245 along with a service token, and (4) provides the service token to the GI agent 248. The GI agent 248 then causes this token to be passed to the service engine(s) in-band (e.g., in a header of the data message that the agent's VM sends to a destination) or out-of-band (i.e., separately from the data messages that the agent's VM sends to a destination).

When the service engine gets the new flow through the SFE port 260, it supplies this flow's service token to the context engine, which uses this service token to identify in its attribute storage 245 the context attributes to supply to the service engine. In the embodiments that the SFE port does not provide this service token to the service engine, the service engine first has to identify the service token by searching its data stores using the flow's identifier before supplying the service token to the context engine.

After identifying the contextual attribute set for a data message flow, the service engine 230 in some embodiments performs its service operation based on service rules that are stored in the context-based service rule storage 240. To perform its service operation, the service engine 230 matches the received attribute subset with corresponding attribute sets that are stored for the service rules. In some embodiments, each service rule in the context-based service rule storage 240 has a rule identifier and an action parameter set.

As mentioned above, the rule identifier of a service rule in some embodiments can be defined in terms of one or more contextual attributes that are not L2-L4 header parameters (e.g., are L7 parameters, user identifiers, group identifiers, process name, loaded module identifiers, consumption parameters, etc.). In some embodiments, a rule identifier can also include L2-L4 header parameters. Also, in some embodiments, one or more parameters in a rule identifier can be specified in terms of an individual value or a wildcard value. Also, in some embodiments, a rule identifier can include a set of individual values or a group identifier, such as a security group identifier, a compute construct identifier, a network construct identifier, etc.

To match a received attribute set with the rules, the service engine compares the received attribute set with the associated identifiers of the service rules stored in the context-based service rule storage 240. Upon identifying a matching rule, the service engine 230 performs a service operation (e.g., an IDS operation, a firewall operation, a load balancing operation, an encryption operation, other middlebox operation, etc.), based on the action parameter set (e.g., based on Allow/Drop parameters, the load balancing criteria, encryption parameters, etc.) of the matching rule.

In some embodiments, the context-based service rule storage 240 is defined in a hierarchical manner to ensure that a message rule check will match a higher priority rule before matching a lower priority rule, when the message's attribute subset matches multiple rules. Also, in some embodiments, the context-based service rule storage 240 contains a default rule that specifies a default action for any message rule check that cannot identify any other service rules; this default rule will be a match for all possible attribute subsets in some embodiments, and ensures that the service rule engine will return an action for all received attribute subsets. In some embodiments, the default rule will specify no service.

Multiple messages can have the same message identifier attribute sets, e.g., when the messages are part of one flow that is associated with one communication session between two machines. Accordingly, after matching a data message with a service rule in the context-based service rule storage 240 based on the message's identified context attribute set, the service engine of some embodiments stores the service rule (or a reference to the service rule) in the connection state cache storage 225, so that it can later use this service rule for subsequent data messages of the same flow.

In some embodiments, the connection state cache storage 225 stores the service rule, or a reference to the service rule, that the service engine 230 identifies for different message identifier sets (e.g., for different five-tuple identifiers that identify different data message flows). In some embodiments, the connection state cache storage 225 stores each service rule, or reference to the service rule, with an identifier (e.g., a flow's five-tuple identifier) that is generated from the matching message identifier set.

Before checking with the context-based service rule storage 240 for a particular message, a service engine 230 of some embodiments checks the connection state cache storage 225 to determine whether this storage has previously identified a service rule for this message's flow. If not, the service engine 230 identifies the contextual attribute set for the message flow, and then checks the context-based service rule storage 240 for a service rule that matches the message's identified attribute set and/or its five-tuple identifier. When the connection state data storage has an entry for the particular message, the service engine performs its service operation (e.g., its IDS operation) based on this service rule's action parameter set (e.g., based on hop list identified by this service rule in the connection cache 225).

In addition to the above-described operations, the IDS engine 222 performs some additional operations. Specifically, after being called by an SFE port to process a data message, the IDS engine 222 in some embodiments examines the cached service decision storage to determine whether it has previously examined another data message in the same flow as the received data message. If so, it performs the operation specified in this storage.

If not, the IDS engine 222 in some embodiments supplies the received data message's flow identifier (e.g., its five tuple) to the context engine 250 in order to obtain the set of contextual attributes from the context engine 250 for this flow. The context engine then uses the flow identifier as a lookup key into its attribute storage 245, retrieves the set of contextual attributes stored in connection with this key, and provides this contextual attribute set to the IDS engine. In some embodiments, the IDS engine 222 can direct the context engine to provide a smaller set of contextual attributes by supplying a service token as described above.

The IDS engine then uses the identified set of contextual attributes to identify a subset of the IDS rules that are relevant to the received data message and that do not include all of the IDS rules enforced by the IDS engine. In some embodiments, the IDS engine uses the identified set of contextual attributes to search a data structure stored in the search structure storage 241. This data structure identifies IDS rules that are associated with contextual attributes. In some embodiments, this data structure is a trie data structure.

Figure 3:
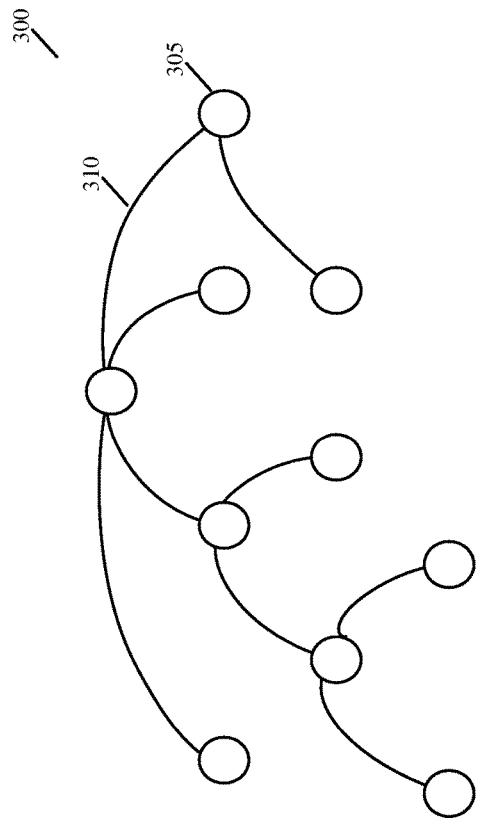
FIG. 3 illustrates a trie data structure used in some embodiments to search for IDS rules applicable to a contextual parameter.

FIG. 3 illustrates an example of a trie data structure that the IDS engine uses in some embodiments to identify IDS rules related to different contextual attributes. As shown, the trie data structure 300 is a tree-like data structure that has numerous nodes 305 and branches 310 that connect the nodes. Each node 305 is associated with a character. By structuring the nodes in a particular way, nodes can be made to represent contextual words and strings. The nodes that represent contextual words or strings in some embodiments include a reference to one or more rule identifiers that identify one or more IDS rules applicable to the contextual attribute associated with the node.

The IDS engine can search the trie structure for a particular contextual attribute by using the characters (e.g., letters, spaces, etc.) in the attribute's words or strings to traverse down the branches along a path to find a node that specifies the contextual attribute. Upon finding the node associated with the contextual attribute that is used for the search, the IDS engine retrieves from the node the identifiers of one or more IDS rules applicable to the searched contextual attribute.

After searching the trie structure for all of the contextual attributes in the set of contextual attributes provided by the context engine for the received data message's flow, the collection of the rule identifiers that the IDS engine retrieves from the trie nodes associated with the searched contextual attributes represents the subset of IDS rules that the IDS engine has to analyzes. These rules are stored in the context-based service rule storage 240 of the IDS engine 222. As mentioned above, these rules in some embodiments have explicit or implicit priority levels that ensure that when a data message matches multiple IDS rules, the IDS rule with the higher priority level is selected for the data message.

After identifying the subset of IDS rules that are applicable to the data message flow, the IDS engine then examines the identified subset of IDS rules for the received data message to identify the highest priority rule in this subset that matches the received data message, and then processes this rule to determine whether the data message is associated with an intrusion. To identify a matching IDS rule, the IDS engine matches the flow identifier (e.g., the five-tuple identifier) and/or the associated context attribute set of the data message to the rule identifiers of the IDS rules.

After identifying a matching IDS rule, the IDS engine performs an IDS operation based on the action parameter of the matching IDS rule. In some embodiments, the IDS operation specifies that the data message should be dropped when the matching rule's action specifies a Drop, but otherwise specifies that the data message should be allowed to pass through. The IDS engine in some embodiments also creates a record in its connection tracker (i.e., in the cached service decision storage 225) with the result of its IDS operation for the data message's flow, so that it can use this record for subsequent data messages of this flow that it is directed to analyze.

Figure 4:
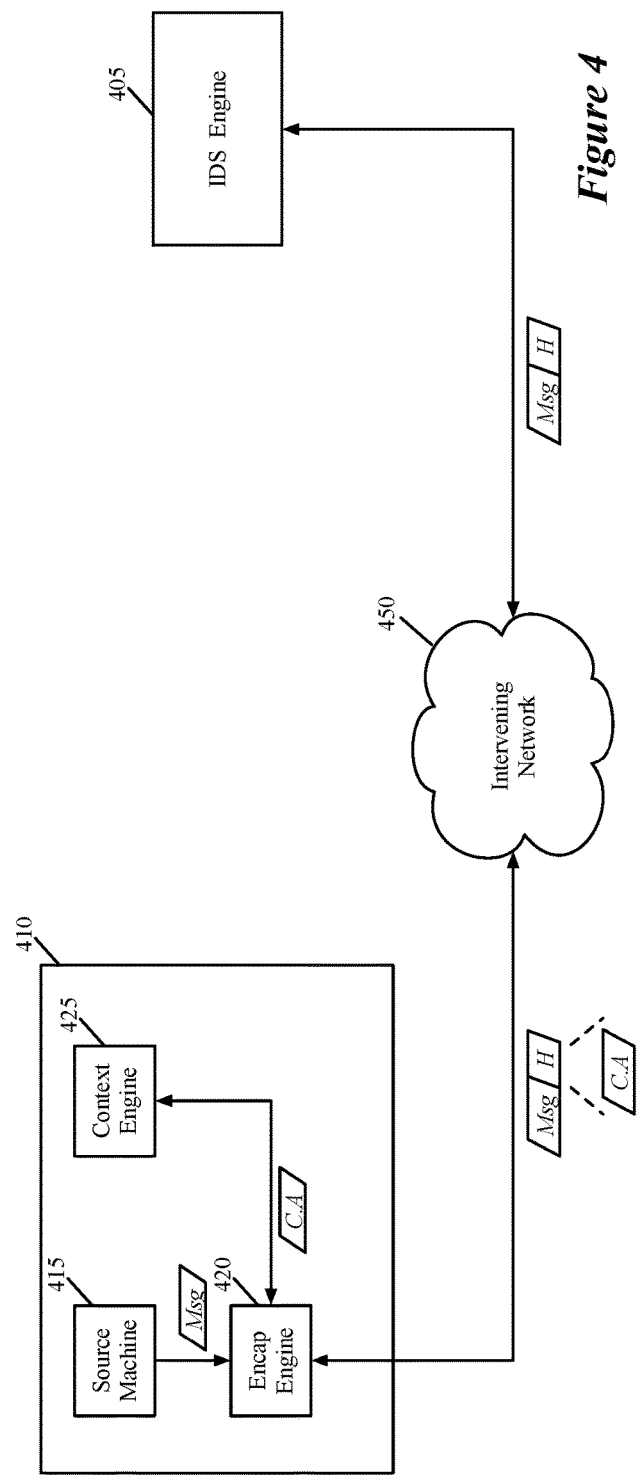
FIG. 4 illustrates storing contextual attributes in a tunnel header in order for an external IDS engine to perform IDS operations on a data message flow sent from a source machine on a host computer.

FIG. 4 illustrates that in some embodiments an IDS engine 405 that processes the data messages is outside of a host computer 410 that executes a source machine 415 that sends the data messages. As shown, an encapsulating module 420 in some embodiments stores the contextual attribute set that is identified for the data message flow by a context engine 425 in an encapsulating tunnel header on the host computer for the external IDS engine 405 to use. The encapsulated data message is then forwarded to the IDS engine 405 through an external network 450. The external IDS engine 405 then uses the contextual attributes stored in the tunnel header to identify the IDS rules that it needs to process for the data message, as further describe below by reference to FIG. 5.

Example of the encapsulating module 420 and the context engine 425 are the encapsulating engine 229 and context engine 250 of FIG. 2. In some embodiments, this encapsulating engine is called by the uplink port 265 before this port passes the data message to the PNIC for forwarding along a network 450 to which the host computer 410 connects. The encapsulating engine 420 uses the data message's flow identifier to collect the set of contextual attributes related to the data message from the context engine 425, and then stores the collected contextual attribute set in the tunnel header that it uses to encapsulate the data message. In some embodiments, the tunnel header is a GENEVE tunnel header that is used to implement an overlay logical network for a set of machines executing on a set of host computers. The contextual attributes set is stored in some embodiments in the variable sized option field of the GENEVE header.

Figure 5:
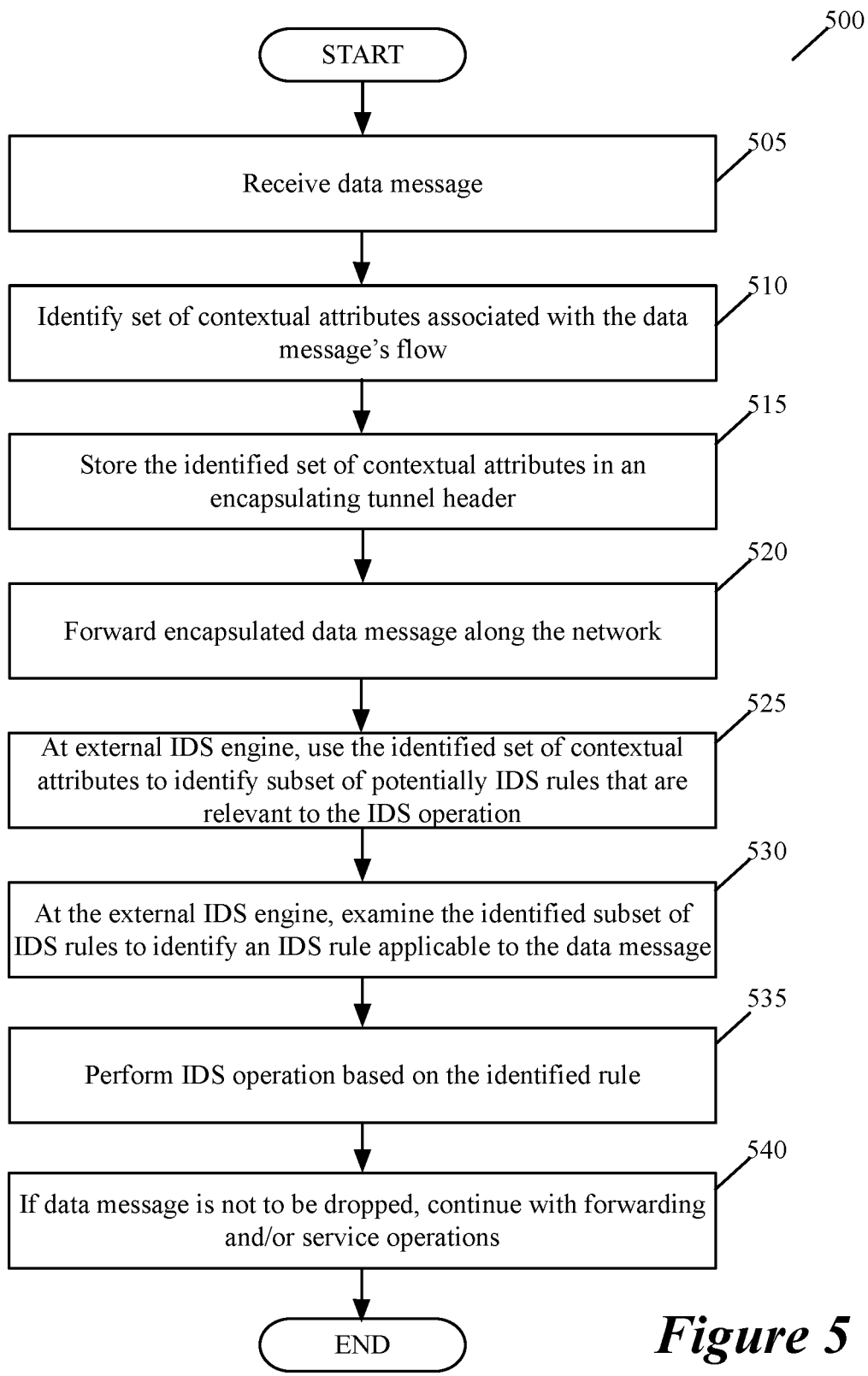
FIG. 5 illustrates another process of some embodiments of the invention.

FIG. 5 illustrates a process 500 that performs the operations illustrated in FIG. 4. The process 500 in some embodiments is performed on a host computer 410 and the IDS engine 405. The process 500 initially receives (at 505) at the encapsulating engine 420 a data message sent by the source machine 415 executing on the host computer 410. In some embodiments, the uplink port 265 of the software forwarding element 210 calls the encapsulating engine. The source machine 415 is a VM or container in some embodiments. The received data message is part of a data message flow, and in some embodiments, it is a first data message in this flow.

For the data message's flow, the encapsulating engine identifies (510) a set of one or more contextual attributes that are different than layers 2, 3 and 4 header values of the data message. Examples of contextual attributes include the source application name, the application version, traffic type identifier, resource consumption, threat level, user ID, group ID, etc. In some embodiments, the encapsulating engine 420 identifies the set of contextual attributes by using the data message's flow identifier to obtain the set of contextual attributes from the context engine 425 executing on the host computer.

As mentioned above, the context engine collects contextual attributes related to data message flows from the GI agents 248 and/or other service modules executing on the host computer. Conjunctively, or alternatively, the context engine in some embodiments obtains the contextual attributes through other mechanisms, e.g., when a machine or an application on a machine starts.

At 515, the encapsulating engine 420 stores the contextual attribute set that it collects for the data message flow in an encapsulating tunnel header and then encapsulates the received data message with this tunnel header. It then passes (at 520) the encapsulating tunnel header to uplink port 265 to pass along to a PNIC of the host computer for forwarding along the network. As mentioned above, the encapsulating tunnel header in some embodiments is a GENEVE tunnel header that is used to implement an overlay logical network for a set of VMs including the source machine 415.

Next, at 525, an IDS engine external to the host computer 410 receives the encapsulated data message. This IDS engine executes on another host computer (e.g., as a service VM) in some embodiments, while it is a standalone appliance in other embodiments. The IDS engine uses the identified set of contextual attributes to identify a subset of the IDS rules that are relevant to the received data message and that do not include all of the IDS rules enforced by the IDS engine. In some embodiments, the IDS engine uses the identified set of contextual attributes to search a data structure (e.g., a trie structure) that identifies IDS rules that are associated with contextual attributes.

After using the identified contextual attribute set to identify the subset of IDS rules that are applicable to the data message flow, the IDS engine then examines (at 530) the identified subset of IDS rules for the received data message to ascertain whether the data message is associated with a network intrusion activity. For instance, in some embodiments, the IDS engine identifies one rule in the identified subset of IDS rules as matching the received data message, and then processes this rule to determine whether the data message is associated with an intrusion.

After identifying a matching IDS rule, the IDS engine performs (at 535) an IDS operation based on the action parameter of the matching IDS rule. In some embodiments, the IDS operation specifies that the data message should be dropped when the matching rule's action specifies a Drop, but otherwise specifies that the data message should be allowed to pass through. Next, at 540, the process 500 continues with the forwarding and/or service operations of the data message on the host computer, when the data message is not supposed to be dropped. This operation entails passing the data message to the next hop along its path its service or forwarding path. When the IDS engine specifies (at 535) the data message should be dropped, the process drops (at 540) the data message. After 540, the process ends.

One of ordinary skill will realize that the processes 100 and 500 are performed differently in other embodiments. For instance, instead of having the uplink port 265 interact with the context engine 250 to identify the set of contextual attributes for a data message flow, other embodiments have another module on the host computer 410 interact with the context engine to identify the set of contextual attributes for a data message flow. Also, instead of using a contextual engine, other embodiments have the source machines embed the contextual attributes related to a flow in metadata or tunnel header that they pass along with the data messages that they send.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
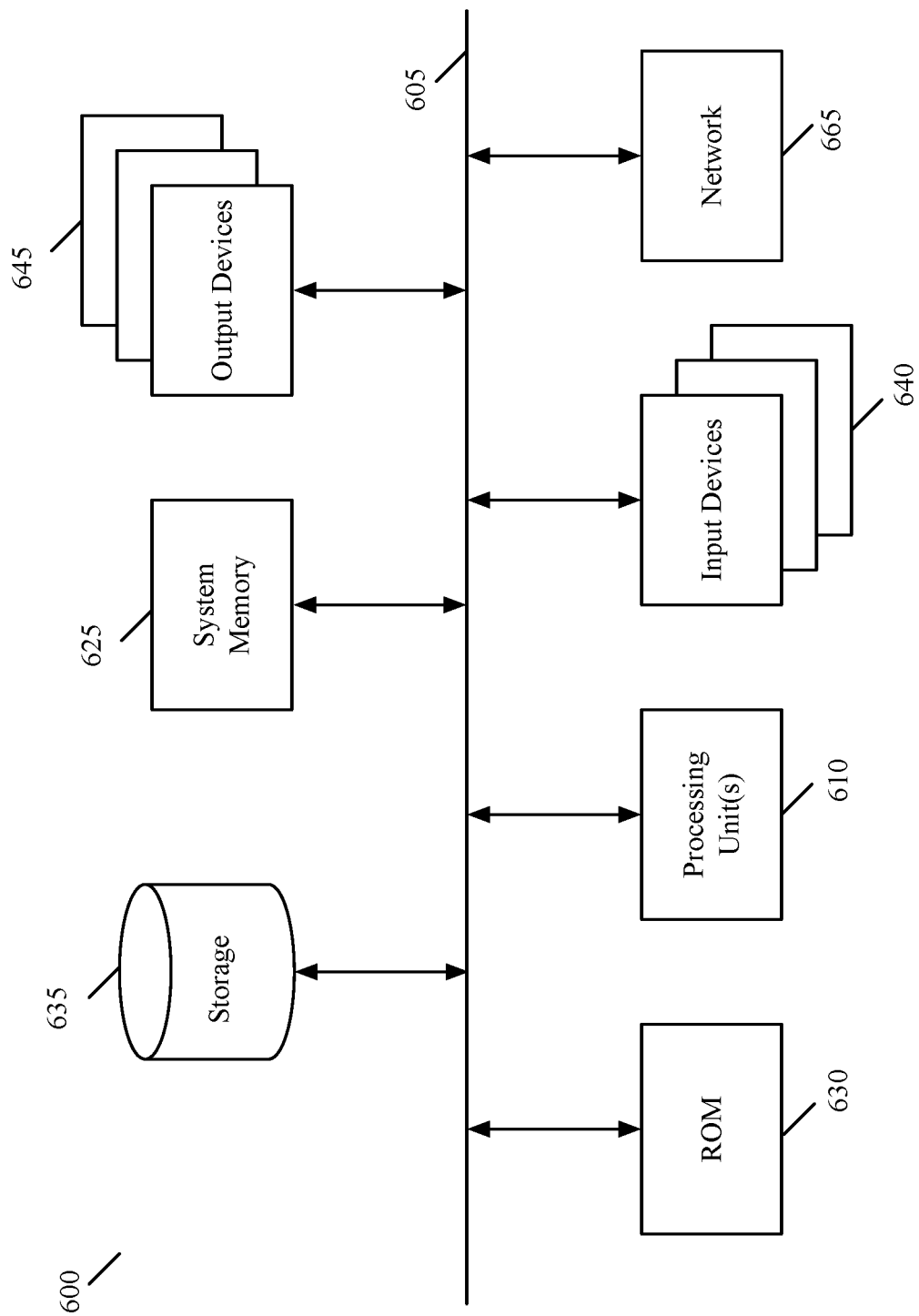
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such as random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet), or a network of networks (such as the Internet). Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of performing intrusion detection operations on a host computer, the method comprising:
    at the host computer:
        receiving a data message of a flow sent by a machine executing on the host computer;
        identifying, for the flow, a set of contextual attributes other than layers 2, 3 and 4 header values;
        using, at an intrusion detection system (IDS) engine executing on the host computer to enforce a plurality of IDS rules, the identified set of contextual attributes to perform a filtering operation that identifies a subset of two or more IDS rules that are relevant to the data message flow and that do not include all of the plurality of IDS rules; and
        examining, at the IDS engine, the subset of IDS rules for the received data message to ascertain whether the received data message is associated with a network intrusion activity.

2. The method of claim 1, wherein the filtering operation uses the identified set of contextual attributes to filter out the IDS rules that are not relevant to the data message flow.

3. The method of claim 1, wherein using the identified set of contextual attributes comprises using the identified set of contextual attributes to search a data structure that identifies IDS rules that are associated with contextual attributes.

4. The method of claim 3, wherein the data structure is a trie structure.

5. The method of claim 1, wherein identifying the set of contextual attributes comprises using an identifier that identifies the data message flow to obtain the set of contextual attributes from a context engine executing on the host computer.

6. The method of claim 5, wherein the context engine obtains the set of contextual attributes from a guest introspection agent executing on the machine that executes on the host computer and that is a source of the data message flow.

7. The method of claim 1, wherein identifying the set of contextual attributes comprises extracting the set of contextual attributes from an encapsulating header for the data message flow.

8. The method of claim 1, wherein identifying the set of contextual attributes comprises obtaining the set of contextual attributes from the machine when the machine powers up and starts to operate on the host computer.

9. The method of claim 1, wherein identified set of contextual attributes comprises at least one contextual attribute specified by an administrator for the machine executing on the host computer or for an application executing on the machine.

10. The method of claim 1, wherein the IDS engine is a virtual machine or container executing on the host computer.

11. A non-transitory machine readable medium storing an intrusion detection system (IDS) program for execution by at least one processing unit of a host computer, the IDS program comprising sets of instructions for:
    receiving a data message of a flow sent by a machine executing on the host computer;
    receiving a set of contextual attributes that are associated with the data message and are attributes other than layers 2, 3 and 4 header values of the data message;

using the identified set of contextual attributes to identify a subset of the IDS rules that are relevant to the data message's flow and that do not include all of a plurality of IDS rules enforced by the IDS program; and examining the subset of IDS rules for the received data message to ascertain whether the received data message is associated with a network intrusion activity.

12. The non-transitory machine readable medium of claim 11, wherein the set of instructions for using the identified set of contextual attributes comprises a set of instructions for filtering out the IDS rules that are not relevant to the data message flow.

13. The non-transitory machine readable medium of claim 11, wherein the set of instructions for using the identified set of contextual attributes comprises a set of instructions for using the identified set of contextual attributes to search a data structure that identifies IDS rules that are associated with contextual attributes.

14. The non-transitory machine readable medium of claim 13, wherein the data structure is a trie structure.

15. The non-transitory machine readable medium of claim 11, wherein the set of instructions for identifying the set of contextual attributes comprises a set of instructions for using an identifier that identifies the data message flow to obtain the set of contextual attributes from a context engine executing on the host computer.

16. The non-transitory machine readable medium of claim 15, wherein the context engine obtains the set of contextual attributes from a guest introspection agent executing on the machine that executes on the host computer and that is a source of the data message flow.

17. The non-transitory machine readable medium of claim 11, wherein the set of instructions for identifying the set of contextual attributes comprises a set of instructions for extracting the set of contextual attributes from an encapsulating header for the data message flow.

18. The non-transitory machine readable medium of claim 11, wherein the set of instructions for identifying the set of contextual attributes comprises a set of instructions for obtaining the set of contextual attributes from a machine that executes on the host computer and that is the source of the data message flow, wherein the set of contextual attributes are obtained from the machine when the machine powers up and starts to operate on the host computer.

19. The non-transitory machine readable medium of claim 11, wherein identified set of contextual attributes comprises at least one contextual attribute specified by an administrator for the machine executing on the host computer or for an application executing on the machine.

20. The non-transitory machine readable medium of claim 11, wherein the IDS program executes in a user space or kernel space of an operating system or hypervisor operating on the host computer.

* * * * *